United States Patent [19]

Castagne

[11] 4,183,270
[45] Jan. 15, 1980

[54] DEVICE FOR CHANGING AND FIXING TOOLS QUICKLY

[76] Inventor: Charles Castagne, 65 100 Pareac, France

[21] Appl. No.: 883,624

[22] Filed: Mar. 6, 1978

[30] Foreign Application Priority Data

Mar. 25, 1977 [FR] France .................. 77 08937

[51] Int. Cl.² ........................................ B23B 29/24
[52] U.S. Cl. ........................ 82/36 A; 74/813 L; 74/826
[58] Field of Search ............ 82/36 A; 74/826, 813 L, 74/815

[56] References Cited

U.S. PATENT DOCUMENTS

| | | | |
|---|---|---|---|
| 2,368,736 | 2/1945 | Wyrick | 82/36 A |
| 2,862,408 | 12/1958 | Stirrett | 82/36 A |
| 3,109,336 | 11/1963 | Rozum | 82/36 A |
| 3,146,648 | 9/1964 | Ortet et al. | 82/36 A |
| 3,288,005 | 11/1966 | Tringale et al. | 82/36 A |

FOREIGN PATENT DOCUMENTS 459835  10/1950  Italy .................................... 74/826

*Primary Examiner*—Leonidas Vlachos
*Attorney, Agent, or Firm*—James C. Wray

[57] ABSTRACT

The invention provides a device for use in the field of machine tools which includes a turret mounted rotatably on a turret-head, several equidistant tool-holders integral with the turret and provided with centering means receiving a centering pin, and centering means housed in the turret-head both to center a tool-holder in its operating position and to lock the turret in an angular position corresponding to said operating position.

2 Claims, 7 Drawing Figures

DEVICE FOR CHANGING AND FIXING TOOLS QUICKLY

The present invention concerns a device for machine tools, notably lathes, allowing quick changing and fixing of tools. Devices for fixing tools quickly which centre the tool on a tool-holder are already known. Arranging several tools working simultaneously on a lathe is also known. The device according to the invention provides for the need, during a given machining operation, to work in a sequence of phases, the tool required for each phase being capable of being fitted quickly and simply. Among examples of such operations the machinging of parts, e.g. milling, reaming or turning, can be quoted. The tools used successively during the machining of a given part vary either in type or in positioning in relation to the part to be machined.

According to the invention, the device for changing and fixing tools quickly, notably for lathes, comprising a fixed turret-head and a turret mounted rotatingly on said turret-head, one or several removable tool-holders being fixed on the turret, is essentially characterised in that the turret is carried on the conical nose of the turret-head, that the tool-holder(s) is/are provided with means of centring designed to take a centring pin and that means are housed in the turret-head in order both to centre one of the tool-holders in its operating position and lock the turret in an angular position corresponding to said operating position.

The turret mounted rotatingly on the turret-head can carry a varying number of tool-holders, three to eight, for example. The tool the set of which is intended to operate in a predetermined sequence of phases to carry out a given operation is fixed to each tool-holder in advance. At the end of each phase, the tool change is effected by rotating the turret and installing the tool-holder on which the tool for the new phase is mounted.

According to a particular arrangement of the invention, centring of the tool-holder and locking of the turret are effected by means of a control lever of which one section, acting as an eccentric, operates means successively to centre the tool-holder by means of a pin and lock the turret and, respectively, unlock the turret and disengage the pin engaged in the tool-holder. Such an arrangement makes it possible, by manipulating a single lever arm, successively to effect the centring of the tool-holder and the locking of the turret very quickly, safely and simply.

According to a preferred form of embodiment, the turret-head base is traversed by an axial hollow in which are placed a locking chuck and a coupling screw, one shoulder of which is applied against the front face of the turret, the locking chuck being provided with a transversal bore in which the control lever section acting as an eccentric is housed.

According to a special form of embodiment, the lever with a section acting as an eccentric controls, via a stud and a link, the engagement and disengagement respectively of the centring pin, housed in the turret-head and fitted with its return element, of the centring means with which each tool-holder is equipped. Such centring means may advantageously consist of an adjusting eccentric integral with the tool-holder, which eliminates the customary use of adjusting keys.

The tool-holder can, for example, be equipped with a slide designed to take said adjusting eccentric and lock it in the required position by means of a screw.

Other characteristics of the invention will emerge from a reading of the following description and a study of the drawings describing, as a nonlimiting example, forms of embodiment of the device according to the invention equipped with six tool-holders. On these drawings.

Figure 1:
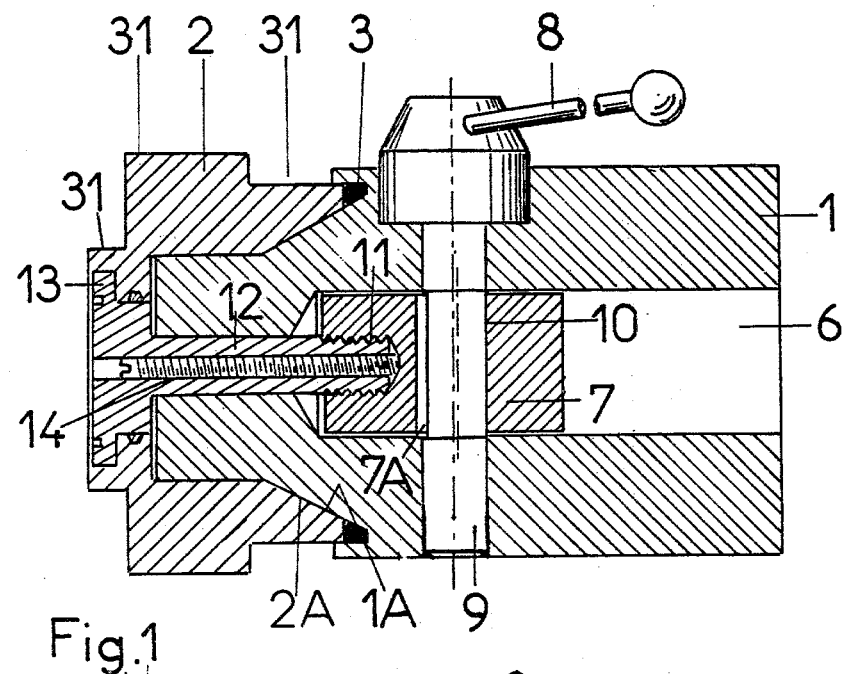
FIG. 1 shows a view from above of the device for changing and fixing lathe tools.
Figure 3:
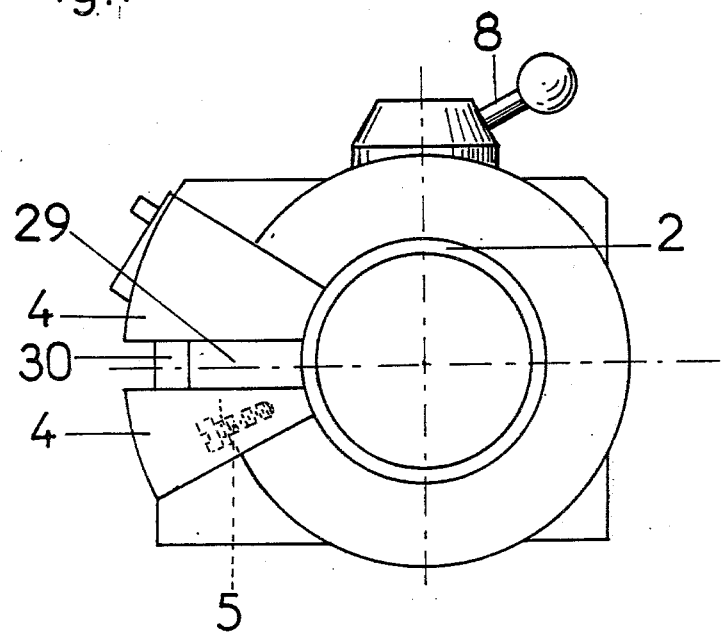
FIG. 3 shows a front view, from the left-hand side of FIGS. 1, 2, of such a device.
Figure 2:
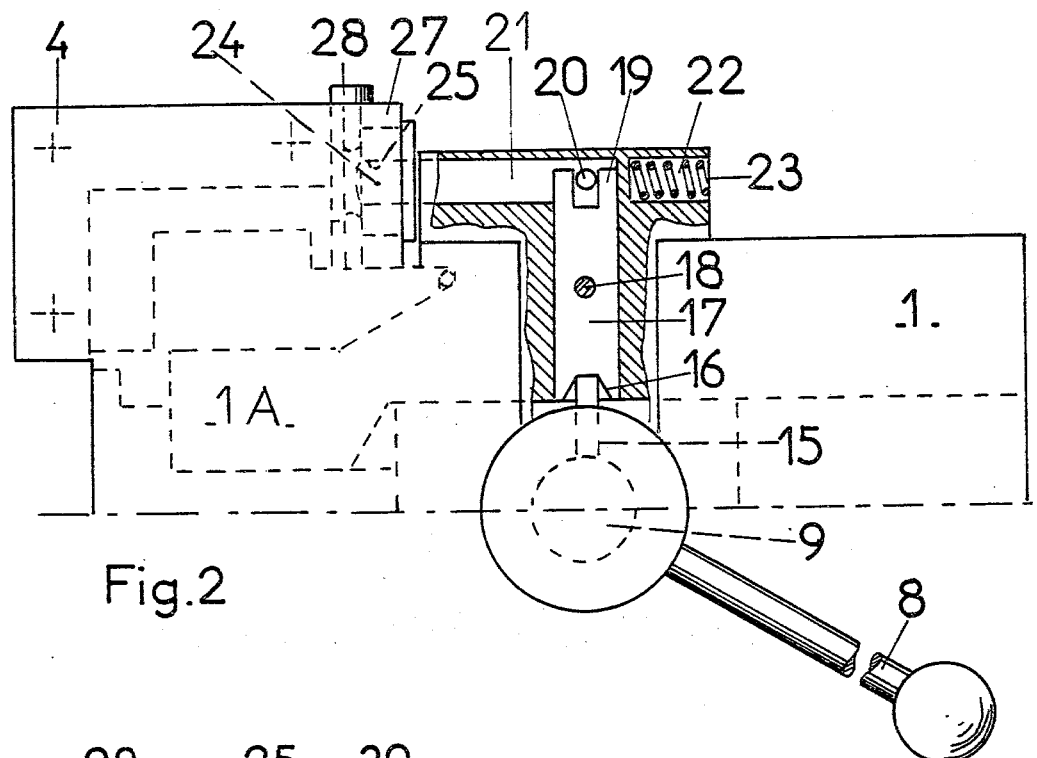
FIG. 2 shows a sectional side view of the turret-head nose and the turret.
Figure 4:
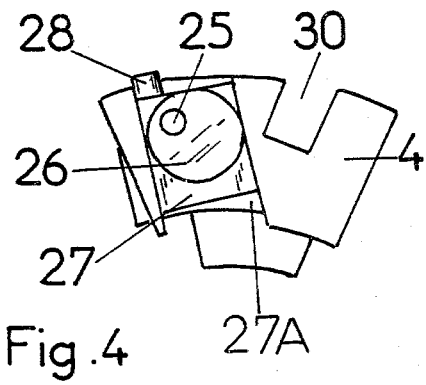
FIG. 4 is a rear elevation view of a tool-holder fitted with its eccentric.
Figure 5:
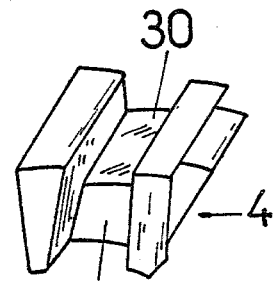
FIG. 5 is a perspective view from the front of the tool-holder.
Figure 6:
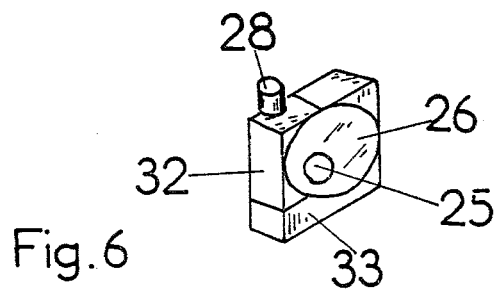
FIG. 6 is a perspective view of the eccentric and its two-part holder.

The fixed turret-head nose 1 mounted on a frame, not shown, comprises an end in the shape of a cone 1A or conical male bearing surface.

The turret 2 has a conical female bearing surface 2A corresponding to bearing surface 1A in the turret-head. The female bearing surface of the turret cooperates with the male bearing surface 1A of the turret-head, the seal between the turret-head nose and the turret being provided by a sealing ring 3. Preferably, the sealing ring is a strong, flexible O-ring which is compressed when the turret is locked and which helps, when said turret is unlocked, to separate the latter from the conical bearing surface 1A by a small distance sufficient to rotate the turret for the reasons explained above. The turret 2 is fixed e.g. to six tool-holders 4 which can be staggered around the circumference of the turret at any angle and preferably at an angle of 60° to one another.

In the axial hollow 6 of the turret-head nose 1 a locking chuck 7 is placed, traversed by a transversal bore 7A in which a control lever 8 is housed, whose rod 9 going through the chuck 7 is shaped at least partly into an eccentric 10. The locking chuck 7 has a threaded hole 11 in which a coupling screw 12 engages, one shoulder 13 of which bears against the front face of turret 2. The coupling screw 12 is hollow and serves as a housing for a locking screw 14 one end of which is maintained against the bottom of threaded hole 11.

A stud 15 integral with the rod or spindle 9 of control lever 8 bears on a cam 16 formed at one end of a link 17 also housed in a passage in turret-head 1. Link 17 is mounted to pivot around a spindle 18 and comprises a forked end 19 in which engages a nipple 20 integral with a centring pin 21 mounted slidingly in a housing 22, said centring pin 21 moving at right angles to the axis of link 17. A return spring 23 exerts a force on pin 21 tending to apply its free end 24 into a blind housing 25 formed in an adjusting eccentric 26, said blind housing being inserted into a drill-hole in an element 27 in two parts 32 and 33 which can be separated or brought together by a screw 28. Each element 27 is mounted in a housing 27A in tool-holder 4 which is made in one piece and includes two perpendicular grooves 29 and 30 suitable to take a front tool and a side tool respectively. Each tool-holder 4 is mounted on turret 2 bearing against the appropriate shoulders 31 formed on the latter.

When a tool-change is made, the procedure is as follows: the handle of the control arm of lever 8 is pushed home, which releases chuck 7, whereby turret 2 is no longer under pressure. During a second phase, continuing the movement of the control arm, stud 15 operates link 17 which pivots around its spindle 10 in order to extract the centring arm 21 from eccentric 26 integral with tool-holder 4. The turret can then rotate freely on the turret nose. Then the turret is rotated to bring into position another tool-holder equipped with the tool required for the next machining phase. The handle is released to cause the centring pin 21, impelled by return spring 22, to assume an intermediate position in which only its spherical end projects beyond the body of the turret-head nose 1. Rotation of the turret is continued until the next tool-holder is pinned by means of the spherical end of pin 21. By pulling the handle, engagement of pin 21 with adjusting eccentric 26 of the next tool-holder 4 and locking the turret in the operating position for the next tool-holder are simultaneously completed.

Figure 7:
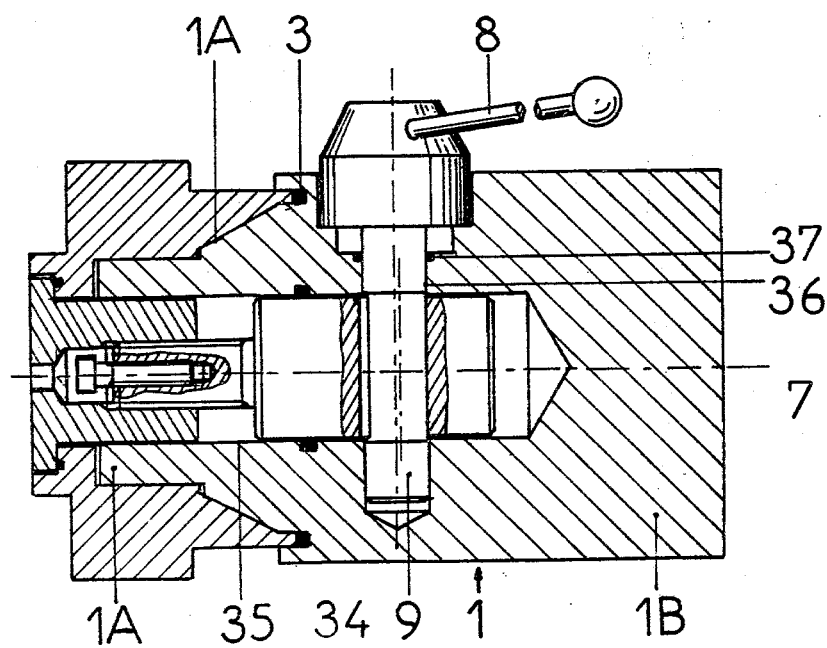
FIG. 7 is a sectional view of another form of embodiment of the device according to the invention.

According to another form of embodiment of the device according to the invention shown in FIG. 7, the nose 1A of turret-head 1 is pierced by a blind axial hollow 35 which takes the locking chuck 7 and rod 9 operated by control lever 8 is housed in a blind hollow 36 at right angles to the former so that the turret-head forms a sealed enclosure in which the various elements operate in an oil bath. The seal is provided by ring 3 at the base of the conical nose and by one or several sealing elements, e.g. a flexible ring 37 positioned adjacent to the top end of the hollow receiving rod 9 in an annular groove in said hollow and a flexible ring 34 positioned on locking chuck 7 in a suitable annular groove in the turret-head bore.

This arrangement of the invention leaves the rear part 1B of the turret-head free of all elements and said part can be shortened. The turret-head according to the invention is fixed to the machine tool in any known manner.

The adjusting eccentric of each tool-holder which is not operating is held in position by a screw, which locks it on its slide. The tool-holder change operation is extremely brief, of the order of about two seconds. The device according to the invention allows the phases of the intended operation to be programmed and an appreciable saving of time in the execution thereof to be made. By eliminating the task of fixing tools during the machining operation, it also eliminates tool fixing faults which would not fail to occur if tools had to be fixed hastily during breaks in work in an attempt to make the latter as short as possible.

It goes without saying that changes in and variations of the device described could be made, without thereby departing from the context of the invention.

I claim:

1. In a device for changing and fixing tools quickly, notably for lathes, of the kind having a fixed turret-head, a turret mounted rotatably on said turret-head, and one or more removable tool-holders fixed on said turret, the improvement that the turret is carried on a conical nose of said turret-head, that said tool-holder(s) is/are provided with centring means to receive a centring pin, and that means are housed in the turret-head both to centre one of the tool-holders in its operating position and to lock the turret in an angular position corresponding to said operating position, and wherein each tool-holder is equipped with centring means consisting of an adjusting eccentric integral with the tool-holder mounted in a two-part element whose sliding in a groove compensates for the linear movement of the rod of the eccentric in an axis radial to the turret.

2. A device, according to claim 1, wherein the adjusting eccentric is positioned in a two-part element mounted in a groove machined in the tool-holder, and wherein the eccentric is locked by means of a single screw which both locks the eccentric in the two-part element and locks this two-part element in its groove.

* * * * *